(12) United States Patent
Mandal et al.

(10) Patent No.: US 11,165,756 B2
(45) Date of Patent: Nov. 2, 2021

(54) DELAYED-ACCESS ENCRYPTION FOR BLOCKCHAIN FIELD

(71) Applicant: FUJITSU LIMITED, Kawasaki (JP)

(72) Inventors: Avradip Mandal, Sunnyvale, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 261 days.

(21) Appl. No.: 16/005,537

(22) Filed: Jun. 11, 2018

(65) Prior Publication Data
US 2019/0379646 A1 Dec. 12, 2019

(51) Int. Cl.
*H04L 29/06* (2006.01)
*H04L 9/30* (2006.01)
*H04L 9/08* (2006.01)

(52) U.S. Cl.
CPC ........ *H04L 63/0442* (2013.01); *H04L 9/0819* (2013.01); *H04L 9/0861* (2013.01); *H04L 9/3073* (2013.01); *H04L 63/123* (2013.01)

(58) Field of Classification Search
CPC ... H04L 9/0819; H04L 9/0861; H04L 9/3073; H04L 63/0442; H04L 63/123
See application file for complete search history.

(56) References Cited

U.S. PATENT DOCUMENTS

| | | | | |
|---|---|---|---|---|
| 7,711,113 | B2* | 5/2010 | Takahashi | H04L 9/3247 380/30 |
| 8,023,646 | B2* | 9/2011 | Boyen | H04L 9/083 380/30 |
| 2001/0044886 | A1* | 11/2001 | Cassagnol | G06F 21/6245 711/163 |
| 2010/0208865 | A1* | 8/2010 | Sendai | A61B 6/022 378/28 |

FOREIGN PATENT DOCUMENTS

WO WO-2017145021 A1 * 8/2017 ........... H04L 9/0637

OTHER PUBLICATIONS

Jia Liu, How to build time-lock encryption, Feb. 3, 2018, Springer Link.*
Carlos Gomez, BlockChain, besides bitcoin, Teldat, Feb. 13, 2020, Digtial Transformation.*
Jager, Tibor. "How to Build Time-Lock Encryption." IACR Cryptology ePrint Archive 2015 (May 2015): 478.

(Continued)

Primary Examiner — Kevin Bechtel
Assistant Examiner — Thanh H Le
(74) *Attorney, Agent, or Firm* — Maschoff Brennan (57) ABSTRACT

A method of transmitting a message via a blockchain network is provided. A method may include encrypting, via a first identity-based encryption (IBE) function, a message to generate a ciphertext. The method may further include transmitting the ciphertext to each node of a plurality of nodes in a blockchain network. Further, the method may (Continued)

include decrypting, via a second IBE function, the ciphertext at each node of the plurality of nodes in the blockchain network after at least one condition is met.

17 Claims, 5 Drawing Sheets

(56) References Cited

OTHER PUBLICATIONS

Boneh, Dan, Xavier Boyen, and Shai Halevi. "Chosen ciphertext secure public key threshold encryption without random oracles." Cryptographers' Track at the RSA Conference. Springer Berlin Heidelberg, Feb. 15, 2006.
Bellare, Mihir, and Viet Tung Hoang. "Adaptive witness encryption and asymmetric password-based cryptography." IACR International Workshop on Public Key Cryptography. Springer Berlin Heidelberg, Feb. 11, 2015.
Cheon, Jung Hee, Nicholas Hopper, Yongdae Kim, and Ivan Osipkov. "Provably secure timed-release public key encryption." ACM Transactions on Information and System Security (TISSEC) 11, No. 2 (May 2008): 4.
Unruh, Dominique. "Revocable quantum timed-release encryption." Journal of the ACM (JACM) 62.6 (Dec. 10, 2015): 49.
Boneh, Dan, and Moni Naor. "Timed commitments." Annual International Cryptology Conference. Springer Berlin Heidelberg, Aug. 11, 2000.
Brassard, Gilles, David Chaum, and Claude Crépeau. "Minimum disclosure proofs of knowledge." Journal of Computer and System Sciences 37.2 (Oct. 1988): 156-189.
Rivest, Ronald L., Adi Shamir, and David A. Wagner. "Time-lock puzzles and timed-release crypto." (Mar. 10, 1996).
Boneh, Dan, and Matt Franklin. "Identity-based encryption from the Weil pairing." Annual International Cryptology Conference. Springer Berlin Heidelberg, Aug. 2, 2001.

* cited by examiner

DELAYED-ACCESS ENCRYPTION FOR BLOCKCHAIN FIELD

FIELD

The embodiments discussed herein relate to delayed-access encryption for blockchain.

BACKGROUND

Two or more electronic devices may send and receive data via a network. Various protocols may enable electronic devices to exchange encrypted messages via a network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include encrypting, via a first identity-based encryption (IBE) function, a message to generate a ciphertext. The method may further include transmitting the ciphertext to each node of a plurality of nodes in a blockchain network. Further, the method may include decrypting, via a second IBE function, the ciphertext at each node of the plurality of nodes in the blockchain network after at least one condition is met.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Cryptographic schemes may allow a party (e.g., a "committer") to commit to a chosen statement while keeping the commitment hidden from others. At a later point in time, the commitment may be opened and shown to others. Security of the commitment scheme may guarantee that 1) the commitment (e.g. a committed statement) remains hidden to others before opening and 2) after committing, the committer may not change the commitment. Time-locked encryption is a form of a commitment scheme wherein a commitment is opened automatically after some amount of time has passed, without any direct involvement of the committer.

Some conventional time-locked encryption systems use an online trusted third party. Further, some other conventional systems are based on an extractable witness encryption scheme. However, decryption processes that require interaction with a sender and/or a trusted third party have proven to be less than ideal, and the use of a witness encryption scheme for nondeterministic polynomial time (NP) languages makes systems impractical for real life use cases.

Various embodiments discussed herein relate to delayed-access encryption, wherein decryption is possible after one or more conditions are met. In at least some embodiments, an Identity Based Encryption (IBE) scheme may be used in combination with a blockchain network with delayed access. For example, according to some embodiments, a party with, for example, considerable amount of computational resources may not be able to decrypt before one or more conditions (e.g., a deadline) are met. Further, authorized entities (e.g., with relatively modest computational budgets) may be able decrypt the message after the one or more conditions are met. In at least some embodiments, decryption may be possible without any interaction with a sender and/or a trusted third party.

Thus, various embodiments of the present disclosure provide a technical solution to a problem that arises from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

IBE is a public key encryption scheme wherein a public key may include an arbitrary string (e.g. identity of the receiver). In some IBE schemes, a master authority may generate a decryption key corresponding to any identity. In at least some embodiments, a "k out of n" threshold version of an IBE scheme may be utilized wherein a master authority may delegate a decryption key generation procedure to n parties. If at least k out of those n parties agree (e.g., validate), a decryption key corresponding to any identity may be generated.

A threshold IBE scheme may include various functions for receiving various inputs and generating various outputs. For example, a threshold IBE scheme may include a setup function (e.g., Setup), which may receive, as inputs, a number of decryption servers n, a threshold k (e.g., $1<=k<=n$), and a security parameter $\lambda$. The setup function may output system parameters PK, a verification key VK, and master key shares vector ($SK=(SK_1 \ldots, SK_n)$), which may be analogous to a private key shares definition of threshold public-key encryption (TPKE). A decryption server i may be provided a master key share (i, $Sk_i$).

Furthermore, a threshold IBE scheme may include a share key generation function (e.g., ShareKeyGen), which may receive, as inputs, system parameters PK, an identity ID, and a master key share (i, $Sk_i$). The share key generation function may output a private key share $\Theta=(i, \hat{\Theta})$ for an identify ID.

A threshold IBE scheme may also include a share verify function (e.g., Share Verify), which may receive, as inputs, system parameters PK, verification key VK and identity ID, and a private key share $\Theta_i$. The share verify function may output "valid" or "invalid."

A threshold IBE scheme may further include a combine function (e.g., Combine), which may receive, as inputs, system parameters PK, verification key VK identity ID, and k private key shares (e.g., $\Theta_1, \ldots \Theta_k$). The combine function may output a private key $d_{ID}$.

In addition, a threshold IBE scheme may include an encrypt function (e.g., Encrypt), which may receive, as inputs, system parameters PK, an identity ID, and a message m. The share verify function may output a ciphertext C.

A threshold IBE scheme may also include a validate function (e.g., ValidateCT), which may receive, as inputs, system parameters PK, identity ID, and ciphertext C. The combine function may output "valid" or "invalid."

A threshold IBE scheme may further include a decrypt function (e.g., Decrypt), which may receive, as inputs, system parameters PK, identity ID, private key $d_{ID}$, and ciphertext C. The validate function may output message m.

According to various embodiments of the present disclosure, a delayed-locked encryption scheme may include a threshold IBE scheme and a blockchain network (e.g., a permission blockchain network).

Embodiments of the present disclosure will be explained with reference to the accompanying drawings.

Figure 1:
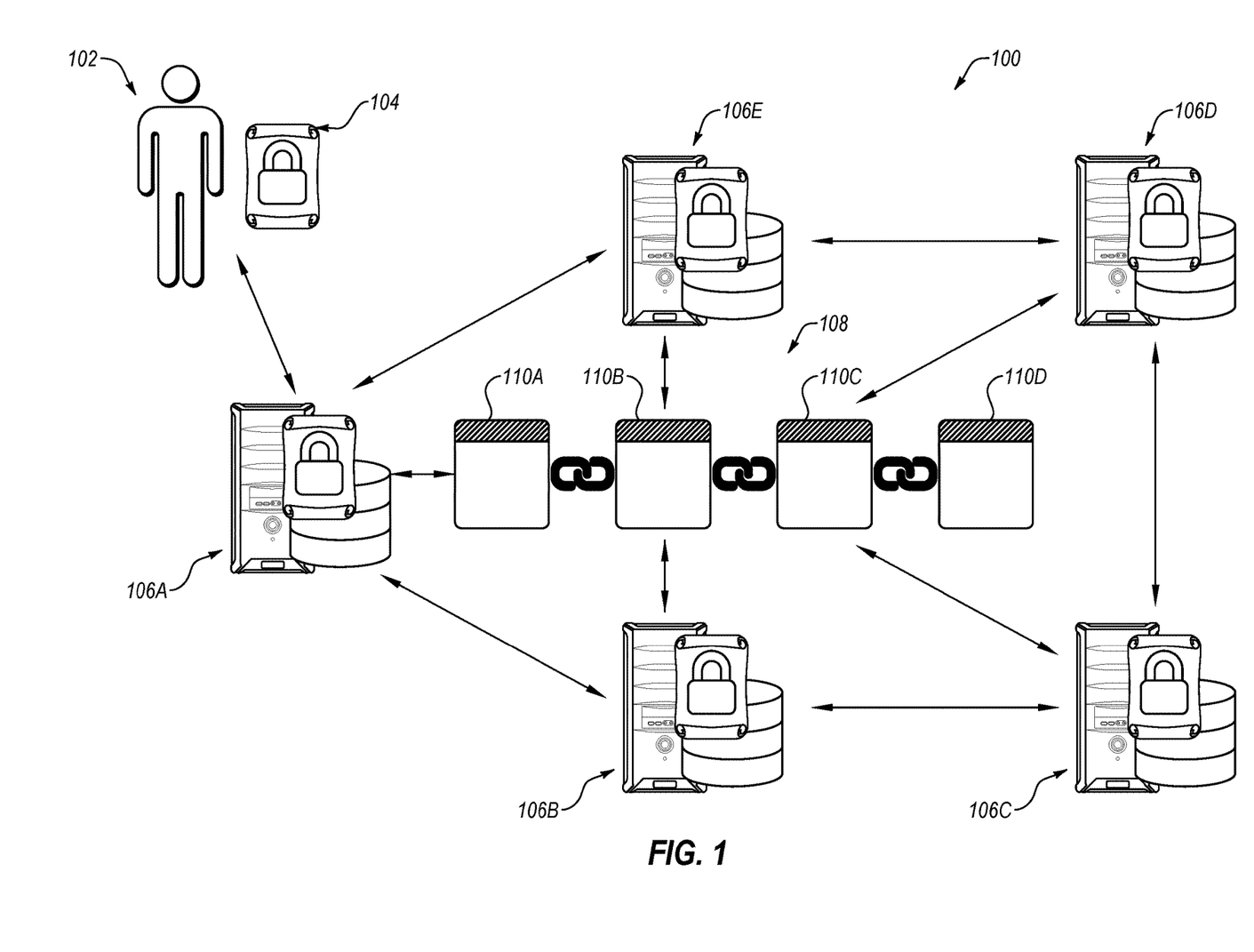
FIG. 1 depicts an example blockchain network.

FIG. 1 depicts a blockchain network 100 including a user 102, a message (also referred to herein as a "transaction") 104, a plurality of nodes 106A-106E, and a block chain 108, which includes a plurality of blocks 110A-110D. Nodes 106 may also be referred to herein as "parties." As described more fully herein, user 102 may, via, for example, a user device, encrypt message 104. Further, user 102 may send encrypted message 104, which may be delay-locked, to a peer node (e.g., peer node 106A). Message 104 may further be sent to other nodes (e.g., peer nodes 106B-106E). Upon one or more conditions being met, a block 110 (e.g., block 110D) may be added to blockchain 108 and message 104 may be decrypted. For example, in some embodiments, upon message 104 being verified by a threshold number of nodes, a block 110 (e.g., block 110D) may be added to blockchain 108 and message 104 may be decrypted. As another example, after expiration of a settable amount of time, a block 110 (e.g., block 110D) may be added to blockchain 108 and message 104 may be decrypted.

Figure 2:
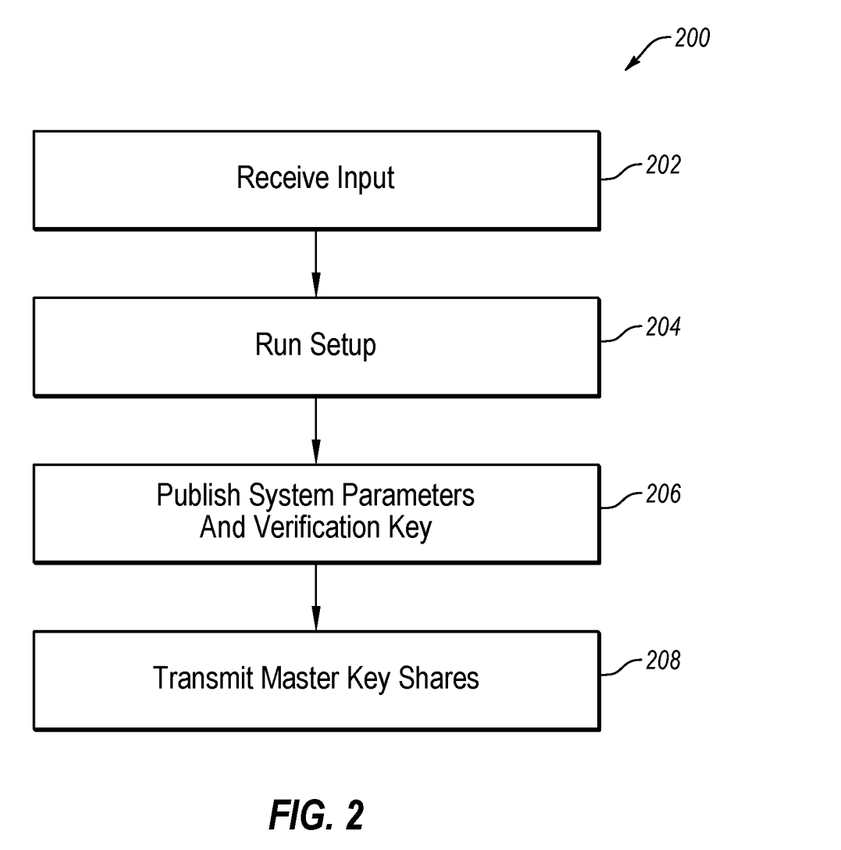
FIG. 2 depicts an example flow diagram of a method of distributing a master key for exchanging encrypted messages.

FIG. 2 illustrates a flowchart of an example method 200 of distributing a key for exchanging encrypted messages, in accordance with one or more embodiments of the present disclosure. In some embodiments, one or more of the operations associated with method 200 may be performed by blockchain network 100 (e.g., see FIG. 1). Alternately or additionally, method 200 may be performed by any suitable system, apparatus, or device (e.g., of blockchain network 100). For example, processor 610 of system 600 of FIG. 6 may perform one or more of the operations associated with method 200. Although illustrated with discrete blocks, the steps and operations associated with one or more of the blocks of method 200 may be divided into additional blocks, combined into fewer blocks, or eliminated, depending on the desired implementation.

At block 202, an input may be received, and method 100 may proceed to block 204. For example, the input may include a number of parties n (e.g., nodes 106 of FIG. 1), a threshold k (e.g., a threshold value of nodes (parties) needed for verification), and a security parameter A. For example, master authority device (e.g., an online trusted $3^{rd}$ party) may receive the input.

At block 204, a setup function may be initiated, and method 200 may proceed to block 206. For example, the setup function, which may include an IBE function, may receive number of parties n, threshold k, and security parameter A, and an output may be generated. For example, the output may include system parameters PK, verification key VK, and a vector of master key shares (e.g., $SK_1, \ldots SK_n$). For example, processor 610 of FIG. 6 (e.g., of a master authority device) may initiate the setup function.

At block 206, system parameters PK and verification key VK may be published, and method 200 may proceed to block 208. For example, processor 710 of FIG. 7 may publish system parameters PK and verification key VK to network 100 of FIG. 1.

At block 208, master key shares $SK_i$ may be transmitted. For example, master key shares $SK_i$ may be transmitted from a master authority device to one or more parties (e.g., nodes 106 of FIG. 1) in a network (e.g., network 100 of FIG. 1).

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 3:
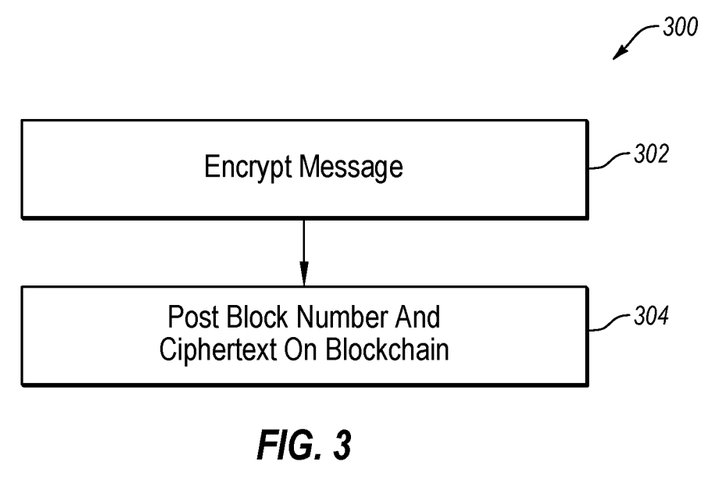
FIG. 3 illustrates an example flow diagram of a method of encrypting a message.

FIG. 3 illustrates a flowchart of an example method 300 of encrypting a message, in accordance with one or more embodiments of the present disclosure. In some embodiments, one or more of the operations associated with method 300 may be performed by blockchain network 100. Alternately or additionally, method 300 may be performed by any suitable system, apparatus, or device (e.g., of blockchain network 100). For example, processor 610 of system 600 of FIG. 6 may perform one or more of the operations associated with method 300. Although illustrated with discrete blocks, the steps and operations associated with one or more of the blocks of method 300 may be divided into additional blocks, combined into fewer blocks, or eliminated, depending on the desired implementation.

At block 302, an encryption operation may be initiated, and method 300 may proceed to block 304. For example, an IBE encryption function (e.g., Encrypt) may receive inputs (e.g., system parameters PK, block number bn, and message m) and generate an output (e.g., ciphertext C). For example, message m and a block number bn may be received at an encryption device (e.g., an "encryptor") of a user (e.g., user 102 of FIG. 1), which may perform the encryption operation. For example, processor 610 (see FIG. 6), which may be associated with an encryption device, may perform the encryption operation.

At block 304, block number bn and ciphertext C may be posted on (e.g., transmitted to and/or recorded on) a blockchain network (e.g., network 100 of FIG. 1). For example, block number bn and ciphertext C may be posted and/or recorded on one or more peer nodes of a blockchain network. For example, processor 610 (see FIG. 6) may transmit block number bn and ciphertext C to one or more nodes the blockchain network.

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 4:
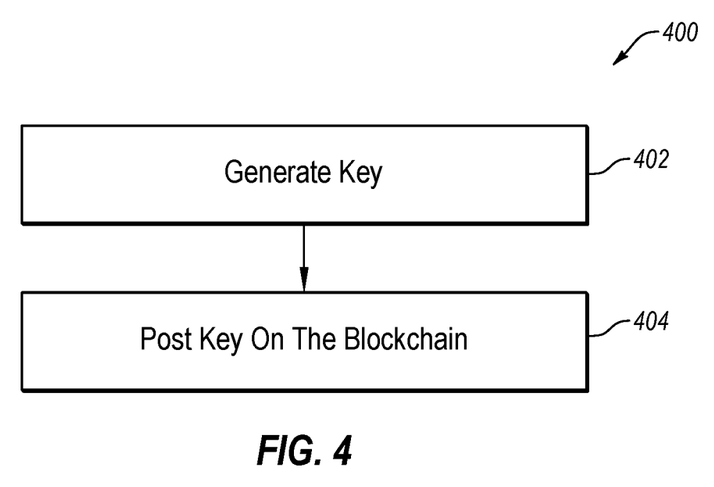
FIG. 4 depicts an example flow diagram of a method of updating a blockchain.

FIG. 4 illustrates a flowchart of an example method 400 of updating a blockchain, in accordance with one or more embodiments of the present disclosure. In some embodiments, one or more of the operations associated with method 400 may be performed by blockchain network 100. Alternately or additionally, method 400 may be performed by any suitable system, apparatus, or device (e.g., of blockchain network 100). For example, processor 610 of system 600 of FIG. 6 may perform one or more of the operations associated with method 400. According to some embodiments, method 400 may be performed by a party i while adding block number bn to a blockchain network (e.g., blockchain network 100 of FIG. 1).

Although illustrated with discrete blocks, the steps and operations associated with one or more of the blocks of method 400 may be divided into additional blocks, combined into fewer blocks, or eliminated, depending on the desired implementation.

At block 402, a key may be generated, and method 400 may proceed to block 404. For example, an IBE key generation function (e.g., ShareKeyGen) may receive inputs (e.g., system parameters PK, i, master key shares $SK_i$, identity ID) and generate an output (e.g. an identity key share (i, $\Theta_i$)). According to at least some embodiments, the key may be used (e.g., by a user that receives the key) to decrypt messages for a particular block of a blockchain. For example, processor 610 (see FIG. 6) may generate the key.

At block 404, the key may be posted (e.g., transmitted to) to the blockchain. For example, identity key share (1, 00 may be posted to the blockchain (e.g., at added block number bn). For example, processor 610 (see FIG. 6) may post the key to the blockchain.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 5:
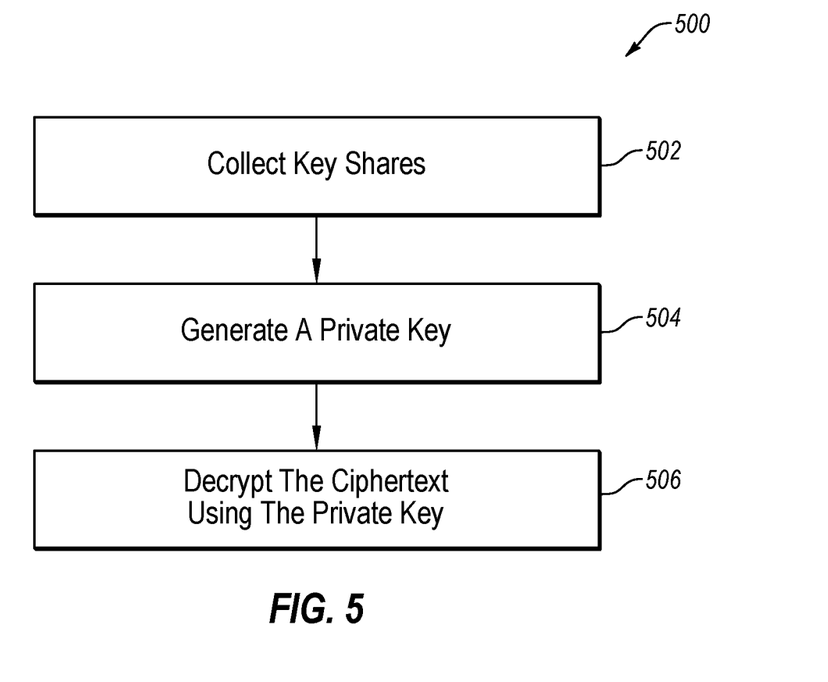
FIG. 5 illustrates an example flow diagram of a method of decrypting a message.

FIG. 5 illustrates a flowchart of an example method 500 of decrypting a message, in accordance with one or more embodiments of the present disclosure. In some embodiments, one or more of the operations associated with method 500 may be performed by blockchain network 100. Alternately or additionally, method 500 may be performed by any suitable system, apparatus, or device (e.g., of blockchain network 100). For example, processor 610 of system 600 of FIG. 6 may perform one or more of the operations associated with method 500. According to some embodiments, method 500 may be performed by a decrypting device (e.g., a "decryptor") upon block number bn being added to a network (e.g., blockchain network 100 of FIG. 1).

Although illustrated with discrete blocks, the steps and operations associated with one or more of the blocks of method 500 may be divided into additional blocks, combined into fewer blocks, or eliminated, depending on the desired implementation.

At block 502, key shares may be collected, and method 500 may proceed to block 504. For example, at least a threshold number (e.g., threshold k) of key shares (i, $\Theta_i$) may be collected such that an IBE share verify function (e.g., Share Verify) returns a "valid" output. For example, processor 710 (see FIG. 7) may perform the share verify function based on the collected key shares.

At block 504, a combine function may be initiated, and method 500 may proceed to block 506. For example, an IBE combine function (e.g., Combine) may receive system parameters PK, verification key VK, block number bn, and set S, which comprises the collected set of key shares (i, $\Theta_i$). Further, the IBE combine function may output a private key $d_{bn}$. For example, processor 610 (see FIG. 6) may perform the combine function.

At block 506, ciphertext may be decrypted. For example, an IBE decrypt function (e.g., Decrypt) may receive, as inputs, system parameters PK, identity ID, private key $d_{bn}$, and ciphertext C. Further the IBE function may generate an output, which may include a decrypted message (e.g., message m).

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

According to at least some embodiments, with delayed-access (e.g., time-locked) encryption, a value may be committed to, encryption, and reveled at a later time (e.g., a later date) regardless of whether a user is present. Revelation of the value may not occur unless there is a consensus. Accordingly, new applications, which were otherwise impractical or computationally intensive, may be possible. For example, applications that would have previously required expensive multi-party computation techniques or SNARKs, may be possible. More specifically, for example, auctions, voting, preventing front-running in financial trading networks, and possibly other applications that require commitments may be possible.

For example, in a traditional finance scenario, a client may contact a broker to make a transaction on their behalf. An unethical broker could delay that transaction and send in their own transaction first if the broker thought the client's transaction could move the market. As a more specific example, in blockchain, a client may submit a transaction to a peer to have the transaction accepted in the blockchain. An unethical peer could use this information by delaying the client's transaction and issuing its own transaction beforehand. On a trading network that frequently has big trades (e.g., trades that can move markets), this may be problem.

Using delayed-access (e.g., time-locked) encryption, in accordance with one or more embodiments, a user may send a locked (e.g., time-locked) transaction to a peer node on blockchain. Further, the peer node may propagate the locked transaction to blockchain. At a later point in time, the locked transaction may be decrypted by each peer node with consensus. In at least some embodiments, transactions may be deemed invalid if not processed by a selectable time interval.

Further, a time parameter (e.g., for a time interval) may be settable (e.g., to make misbehavior hard). For example, the time interval may be selected to be of sufficient duration such that only malicious behavior may cause a transaction to not propagate before the time interval expires. In this example, a transaction may fail if it is not processed by expiration of the time interval.

Accordingly, in this and other embodiments, malicious peer nodes may not have an opportunity to act on transactions before they are processed (e.g., because they cannot see transactions before expiration of the time period when they are to be processed).

Further, according to various embodiments, transactions may be processed in the order that they first appeared encrypted on the blockchain such that front-running may be impossible, discounting traffic analysis. Further, front-running may be less likely, since a peer node may only be able to block a transaction, rather than see the transaction before propagating.

As disclosed herein, blockchain decryption may be dependent on a delay and not necessarily on time. Rather, according to various embodiments, blockchain decryption may be dependent on one or more conditions being met. More specifically, for example, blockchain decryption may be dependent on a number of blocks being added to a blockchain (e.g., after the locked message is received at a blockchain).

A blockchain may experience sporadic use, block creation time may be highly non-uniform and/or exact times may be required for an application. In these scenarios, instead of signing a block number, users of a blockchain may sign a blockchain ID concatenated with a time range (e.g., "SupplyChain1234||1/1/2018::5:00-6:00"). This example may enable users that want to post on the blockchain to encrypt to predictable strings that will be signed by peer nodes on the blockchain. This method and/or similar methods with trivial modifications may allow for more exact time locks.

As noted herein, various applications (e.g., any application where a timed commitment may be needed), which may have previously been impractical or computationally intensive, may be possible utilizing one or more of the embodiments disclosed herein. For example, in an auction application, users may time-lock encrypt bids, which may then be revealed at a later, substantially after a deadline for posting a time-locked bid. Determining a winner may be easy and exact. A voting application may be the same or similar to an auction application. In this example, crypto may be used to solve a problem of votes being public.

Figure 6:
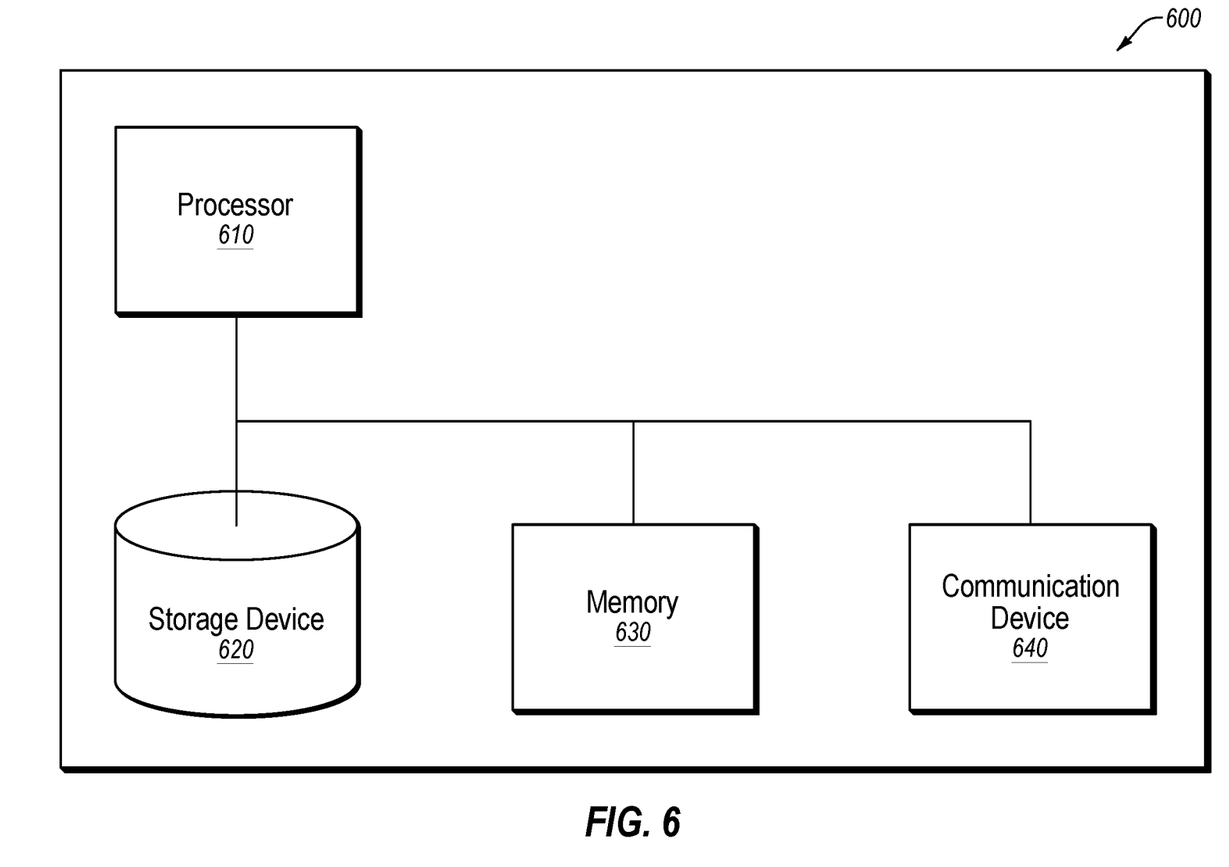
FIG. 6 is a block diagram of an example computing system.

FIG. 6 illustrates an example system 600, according to at least one embodiment described herein. System 600 may include any suitable system, apparatus, or device configured for delayed-access encryption for blockchain. System 600 may include a processor 610, a memory 620, a data storage 630, and a communication device 640, which all may be communicatively coupled. Data storage 630 may include various types of data, such as a number of parties in a network, security parameters, messages (e.g., encrypted and/or decrypted), system parameters, verification keys, private keys, master key shares, and/or other data associated with delayed-access encryption for blockchain.

Generally, processor 610 may include any suitable special-purpose or general-purpose computer, computing entity, or processing device including various computer hardware or software modules and may be configured to execute instructions stored on any applicable computer-readable storage media. For example, processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that processor 610 may include any number of processors distributed across any number of network or physical locations that are configured to perform individually or collectively any number of operations described herein. In some embodiments, processor 610 may interpret and/or execute program instructions and/or process data stored in memory 620, data storage 630, or memory 620 and data storage 630. In some embodiments, processor 610 may fetch program instructions from data storage 630 and load the program instructions into memory 620.

After the program instructions are loaded into memory 620, processor 610 may execute the program instructions, such as instructions to perform one or more blocks of method 200, method 300, method 400, and/or method 500 as described herein. According to various embodiments, processor 610 may run functions of an IBE scheme. For example, processor 610 may generate system parameters, verification keys, private keys, and/or master key shares. Further, for example, processor 610 may encrypt and/or decrypt messages.

Memory 620 and data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 610 to perform a certain operation or group of operations.

Communication unit 640 may include any component, device, system, or combination thereof that is configured to transmit or receive information over a network. In some embodiments, communication unit 640 may communicate with other devices at other locations, the same location, or even other components within the same system. For example, communication unit 640 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. Communication unit 640 may permit data to be exchanged with a network and/or any other devices or systems described in the present disclosure. For example, communication unit 640 may allow system 600 to communicate with other systems and/or devices, such as nodes 106 and or blockchain 108 of FIG. 1.

Modifications, additions, or omissions may be made to system 600 without departing from the scope of the present disclosure. For example, data storage 630 may be multiple different storage mediums located in multiple locations and accessed by processor 610 through a network.

As indicated above, the embodiments described herein may include the use of a special purpose or general purpose computer (e.g., processor 610 of FIG. 6) including various computer hardware or software modules, as discussed in greater detail below. Further, as indicated above, embodiments described herein may be implemented using computer-readable media (e.g., memory 620 or data storage 630 of FIG. 6) for carrying or having computer-executable instructions or data structures stored thereon.

As used herein, the terms "module" or "component" may refer to specific hardware implementations configured to perform the operations of the module or component and/or software objects or software routines that may be stored on and/or executed by, for example, blockchain 108, one or more of nodes 106, and/or computing system 600. In some embodiments, the different components and modules described herein may be implemented as objects or processes that execute on a computing system (e.g., as separate threads). While some of the system and methods described herein are generally described as being implemented in software (stored on and/or executed by system 600), specific hardware implementations or a combination of software and specific hardware implementations are also possible and contemplated. In this description, a "computing entity" may include any computing system as defined herein, or any module or combination of modules running on a computing system, such as system 600.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a transaction and a time period for execution of the transaction;
   obtaining a ciphertext at a plurality of nodes in a blockchain network, the ciphertext generated through encryption of the transaction, the encryption of the transaction based on a particular block number that is higher than the highest block number in the blockchain network when the ciphertext is generated and the particular block number selected based on the time period;
   obtaining the particular block number at the plurality of nodes in the blockchain network;
   posting the ciphertext and the particular block number on the blockchain network at a first block with a block number less than the particular block number;
   after a second block with the particular block number is posted on the blockchain network, generating a private key based on a plurality of partial keys obtained from two or more nodes of the plurality of nodes in the blockchain network, the plurality of partial keys generated based on the second block being posted on the blockchain network; and
   decrypting the ciphertext using the private key, wherein the transaction is invalid in response to the decryption occurring after the time period.

2. The method of claim 1, further comprising generating, via identity-based encryption (IBE), one or more system parameters, a verification key, and a master key based on a number of nodes in the blockchain network, a threshold value, and a security parameter.

3. The method of claim 2, further comprising transmitting the master key to one or more nodes of the plurality of nodes in the blockchain network.

4. The method of claim 2, further comprising publishing the one or more system parameters and the verification key.

5. The method of claim 1, further comprising posting a first partial key of the plurality of partial keys to the blockchain network when the second block on the blockchain network is added to the blockchain network.

6. The method of claim 5, wherein generating the first partial key is performed via identity-based encryption (IBE).

7. The method of claim 1, wherein the private key is further based on the particular block number.

8. The method of claim 1, wherein the ciphertext is generated based on a threshold number of nodes of the plurality of nodes in the blockchain network and the private key is generated in response to a number of the plurality of partial keys being equal to or greater than the threshold number.

9. One or more non-transitory computer-readable media that include instructions that, when executed by one or more processing systems, are configured to cause the one or more processing systems to perform operations, the operations comprising:
- obtaining a transaction and a time period for execution of the transaction;
- obtaining a ciphertext at a plurality of nodes in a blockchain network, the ciphertext generated through encryption of the transaction, the encryption of the transaction based on a particular block number that is higher than the highest block number in the blockchain network when the ciphertext is generated and the particular block number selected based on the time period;
- obtaining, the particular block number at the plurality of nodes in the blockchain network;
- posting the ciphertext and the particular block number on the blockchain network at a first block with a block number less than the particular block number;
- after a second block with the particular block number is posted on the blockchain network, generating a private key based on a plurality of partial keys obtained from two or more nodes of the plurality of nodes in the blockchain network, the plurality of partial keys generated based on the second block being posted on the blockchain network; and
- decrypting the ciphertext using the private key, wherein the transaction is invalid in response to the decryption occurring after the time period.

10. The computer-readable media of claim 9, the operations further comprising generating one or more system parameters, a verification key, and a master key based on a number of nodes in the blockchain network, a threshold value, and a security parameter.

11. The computer-readable media of claim 10, the operations further comprising transmitting the master key to each node of the plurality of nodes in the blockchain network.

12. The computer-readable media of claim 10, the operations further comprising publishing the one or more system parameters and the verification key.

13. The computer-readable media of claim 9, the operations further comprising posting a first partial key of the plurality of partial keys to the blockchain network when the second block on the blockchain network is added to the blockchain network.

14. The computer-readable media of claim 13, wherein generating the first partial key is performed via IBE.

15. The computer-readable media of claim 9, wherein the private key is further based on the particular block number.

16. The computer-readable media of claim 9, wherein the ciphertext is generated based on a threshold number of nodes of the plurality of nodes in the blockchain network and the private key is generated in response to a number of the plurality of partial keys being equal to or greater than the threshold number.

17. A method of transmitting a communication via a network, the method comprising:
- obtaining a ciphertext at a plurality of nodes in a blockchain network, the ciphertext generated through encryption of a message, the encryption based on a blockchain identifier concatenated with a time range, the time range is in the future from when the ciphertext is obtained at the blockchain network;
- signing, by each of two or more of the nodes of the blockchain network, the blockchain identifier concatenated with the time range;
- generating a private key based on the time range and the two or more signed blockchain identifiers concatenated with the time range; and
- during the time range, decrypting the ciphertext obtained at the blockchain network using the private key.

* * * * *